United States Patent
Suau et al.

(10) Patent No.: US 8,920,550 B2
(45) Date of Patent: Dec. 30, 2014

(54) HYDROPHOBIZATION AGENT AND USE FOR THE SURFACE TREATMENT OF MINERAL MATTER PARTICLES

(71) Applicant: Coatex, Genay (FR)

(72) Inventors: Jean-Marc Suau, Lucenay (FR); Jacques Mongoin, Quincieux (FR); Christian Jacquemet, Lyons (FR)

(73) Assignee: Coatex, Genay (FR)

( * ) Notice: Subject to any disclaimer, the term of this patent is extended or adjusted under 35 U.S.C. 154(b) by 0 days.

(21) Appl. No.: 14/182,428

(22) Filed: Feb. 18, 2014

(65) Prior Publication Data

US 2014/0238272 A1   Aug. 28, 2014

Related U.S. Application Data

(60) Provisional application No. 61/771,101, filed on Mar. 1, 2013.

(30) Foreign Application Priority Data

Feb. 22, 2013   (FR) ..................................... 13 51542

(51) Int. Cl.
| | | |
|---|---|---|
| *C08K 5/521* | (2006.01) | |
| *C08K 9/04* | (2006.01) | |
| *C09K 3/18* | (2006.01) | |
| *C09C 1/62* | (2006.01) | |

(52) U.S. Cl.
CPC ...................................... *C09C 1/62* (2013.01)

USPC ............... 106/2; 106/417; 106/447; 106/462; 106/503; 106/781; 106/795; 106/801; 106/806; 428/403; 428/404

(58) Field of Classification Search
USPC ............. 106/2, 417, 447, 462, 503, 781, 795, 106/801, 806; 428/403, 404
See application file for complete search history.

(56) References Cited

U.S. PATENT DOCUMENTS

| | | | |
|---|---|---|---|
| 3,341,343 A | | 9/1967 | Beiswanger et al. |
| 4,115,483 A | | 9/1978 | Davis |
| 4,661,537 A | | 4/1987 | Ancker et al. |
| 4,803,231 A | * | 2/1989 | Seinera et al. ................ 523/219 |
| 4,889,879 A | * | 12/1989 | Seinera et al. .................. 524/13 |
| 5,464,895 A | * | 11/1995 | Blanchard et al. ............. 524/425 |
| 2010/0324186 A1 | * | 12/2010 | Birmingham et al. ........ 524/262 |

FOREIGN PATENT DOCUMENTS

| | | | | |
|---|---|---|---|---|
| EP | 0 495 733 A1 | * | 7/1992 | ............. C08L 25/04 |
| EP | 0 401 871 B1 | | 12/1994 | |

OTHER PUBLICATIONS

International Search Report issued Apr. 17, 2014 in PCT/FR2014/050333 (with English translation of categories of cited documents).

* cited by examiner

*Primary Examiner* — Anthony J Green

(74) *Attorney, Agent, or Firm* — Oblon, Spivak, McClelland, Maier & Neustadt, L.L.P.

(57) ABSTRACT

The present invention relates to a new mineral matter particle hydrophobization agent and to its various uses for the surface treatment of mineral matter particles.

11 Claims, No Drawings

HYDROPHOBIZATION AGENT AND USE FOR THE SURFACE TREATMENT OF MINERAL MATTER PARTICLES

REFERENCE TO PRIOR APPLICATIONS

This application claims priority to U.S. provisional application Ser. No. 61/771,101, filed Mar. 1, 2013; and to French patent application 13 51542, filed Feb. 22, 2013, all incorporated herein by reference.

The present invention relates to a new mineral matter particle hydrophobization agent and to its various uses for the surface treatment of mineral matter particles.

In general, mineral matter particles are used as inorganic fillers in a variety of applications, in particular in thermoplastic film compositions.

Among the various mineral fillers used, calcium carbonate ($CaCO_3$) is one of the most common, mainly because of its availability in a readily usable and low-cost form. However, calcium carbonate has a hydrophilic surface which makes it incompatible with hydrophobic polymers, for example, polyethylene (PE) and polypropylene (PP). To solve this technical problem, the surface of calcium carbonate is made hydrophobic by the use of various surface modifiers. Among these, stearic acid is the surface modifier (also called a hydrophobization or antagonist agent) that is most commonly used, in particular because of its low cost and its origin.

In particular, it is known from document WO 95/17441 (ECC International Inc.) to cover carbonate filler particles with one or more fatty acids having 12 to 20 carbon atoms with the aim of increasing the proportion of mineral fillers in thermoplastic pellets or granules.

Other documents of the prior art suggest the use of stearic acid (or one of its derivatives) to treat calcium carbonate with the aim of solving the technical problem of the susceptibility of mineral fillers to surface moisture pick-up.

Document U.S. Pat. No. 5,008,296 (Hercules Inc.) describes a method for reducing the moisture content of a breathable film composition comprising 0.1 to 3% by weight of calcium stearate.

Document EP 0 998 522 (Imerys Minerals Limited) in particular describes the treatment of inorganic particulate material with a hydrophobizing surface treatment agent, the materials so obtained having a reduced moisture content and a low susceptibility to surface moisture pick-up. Such particulate materials are used in thermoplastic articles of the breathable film type. The hydrophobizing surface treatment agent is of the aliphatic carboxylic acid type having 10 to 24 carbon atoms, such as stearic acid.

Still other documents, for example, U.S. Pat. No. 4,698,372, describe the use of stearic acid as a hydrophobizing agent, in particular to reduce the surface tension of the mineral filler. Other documents, for example U.S. Pat. No. 4,350,655 (Biax Filmerfilm) describe synthetic film preparation methods consisting of mixing a thermoplastic polymer with an inorganic filler on which has been deposited a layer of a fatty acid ester comprising a titanium or silicon atom.

Document EP 2 546 410 (Omya Development AG) describes a method consisting of a step of calcium carbonate particle hydrophobization with the objective of reducing the pitch generated during the preparation of papermaking pulp. The hydrophobization agent is preferably stearic acid.

The article by Supaphol et al. (Colloids and surfaces, A 275 (2006) 114-125) indicates in very general terms that the surface of calcite can be made "organophilic" through the use of surface modifiers such as silanes, titanates, phosphates and stearic acid. No additional detail is given with respect to these surface modifiers.

It is known from documents FR 2 582 310 and FR 2 602 236 (Pluess Staufer AG) to use a polyolefin polymer plasticizing agent as a constituent of thermoplastic aggregates with a high content of powdery mineral material. This plasticizing agent is a phosphate with the formula:

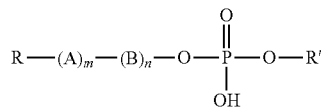

in which (A) is ethylene oxide, (B) is propylene oxide, where $0 \leq (m+n) \leq 24$, R is selected from the group formed by the alkyl radicals, linear or not, saturated or unsaturated, the aryl radicals, the heterocyclics, saturated or not, containing from 5 to 28 carbon atoms and preferably from 8 to 24 carbon atoms, the steroids, and R' is selected from the group constituted by hydrogen, a carbon chain containing from 1 to 4 carbon atoms, and one of radicals belonging to the group defined for R.

Documents FR 2 671 555 and FR 2 671 556 (COATEX) relate to a mineral filler dispersing agent in thermosetting resins of the organophosphorus type, with alkoxylated chains (ethylene oxide and/or propylene oxide) substituted by an aryl group, branched or not. In addition, this agent is not used in these patent applications as a hydrophobization agent for powdery mineral fillers particles.

One object of the present invention is to propose a compound which renders hydrophobic those mineral matter particles that must be formulated with hydrophobic polymers, for example polyethylene (PE) and polypropylene (PP).

Another object of the present invention is to propose such a compound which enables the preparation of compositions (for example, thermoplastics) which have a high mineral matter concentration, which are homogenous and which have an improved fluidity index compared to currently available hydrophobization agents.

These objectives are achieved through the use of a hydrophobization agent according to the present invention.

It is worth noting that in the context of the present invention, the different embodiments described can be combined.

Thus, one object of the present invention consists of a mineral matter particle hydrophobization agent comprising a mixture of the compounds of formulas (I) and (II):

in which:
R represents $C_nH_{2n+1}$ where n is an integer that varies between 6 and 40, the group $C_nH_{2n+1}$ being branched, possibly cyclic, non-aromatic.
X represents H or M, and
M represents a monovalent, divalent or trivalent cation.

Thus, the R group represents a branched carbon chain comprising between 6 and 40 carbon atoms inclusive. As opposed to a linear chain, "branched" must be understood to mean a carbon chain that contains at least one substituted group on the side. It is said that the R group has a main chain (largest number of carbon atoms) and at least one branch (the length of the chain is less than that of the main chain). In the context of the present invention, the R group may comprise one branch, two branches or more.

According to the invention, the R group can be acyclic or cyclic.

When it is cyclic, the R group also comprises, independently from the carbon atoms constituting the ring, a branched carbon chain.

According to the invention, the R group is not alkoxylated. In particular, it does not have ethylene oxide (EO) units or propylene oxide (PO) units.

According to one embodiment of the invention, the R group is branched, acyclic, non-aromatic and of the 2-alkyl-alkyl type.

According to another embodiment of the invention, the R group is selected from the group consisting of 2-butyloctanyl (n represents 12 carbon atoms, R is branched, acyclic and non-aromatic), 2-hexyldecanyl (n represents 16 carbon atoms, R is branched, acyclic and non-aromatic), 2-octyldodecanyl (n represents 20 carbon atoms, R is branched, acyclic and non-aromatic), 2-decyltetradecanyl (n represents 24 carbon atoms, R is branched, acyclic and non-aromatic), 2-dodecylhexadecanyl (n represents 28 carbon atoms, R is branched, acyclic and non-aromatic) and 2-tetradecyloctadecanyl (n represents 32 carbon atoms, R is branched, acyclic and non-aromatic).

According to one embodiment, the hydrophobization agent is such that the molar ratio between the compound of formula (I) and the compound of formula (II) varies between 1:100 and 10:1, for example, between 1:20 to 2:1 or between 1:10 to 1:1.

According to one embodiment of the present invention, the number n of the R group in formulas (I) and (II) varies between 12 and 32 inclusive.

The hydrophobization agent according to the present invention can be found in liquid or solid form at room temperature.

The hydrophobization agent can be found in the solvent-dissolved form (for example, in alcohol, ketone, ester, ether). It can alternatively be found in the non-solubilized form, for example in the form of an emulsion.

According to one embodiment, the hydrophobization agent is in a liquid state at room temperature.

According to another embodiment, the hydrophobization agent is in a solid state at room temperature.

Thus, if it is solid at room temperature, the hydrophobization agent is heated to a temperature that will initiate the solid-liquid phase change. The hydrophobization agent can be heated to a temperature of at least 50° C., for example, to at least 75° C., or to between 50 and 120° C., or to between 70 and 100° C. The hydrophobization agent is thus obtained in molten form.

According to one embodiment of the present invention, said hydrophobization agent comprises a mixture of the compounds of formulas (I) and (II) as well as the compound of the following formula (III):

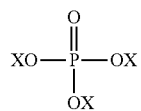
(III)

According to another embodiment of the present invention, said hydrophobization agent comprises a mixture of the compounds of formulas (I) and (II), but it does not comprise the compound of the following formula (IV):

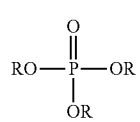
(IV)

According to still another embodiment of the present invention, said hydrophobization agent consists of a mixture of the compounds of formulas (I), (II) and (III) as described above. Thus, according to this embodiment, said hydrophobization agent does not comprise compounds of formula (IV) as described above.

According to one embodiment, compounds (I), (II) and (III) are in their acidic form. According to this embodiment, group X in the compounds of formulas (I), (II) and (III) represents H, and said compounds have the following formulas:

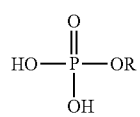
(I')

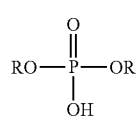
(II')

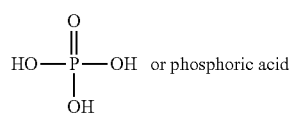
(III')

According to another embodiment, compounds (I), (II) and (III) are in neutralized form, or in other words, in the form of phosphate salts.

One cation is likely to bind to the oxygen atoms of compound (II), which leads to an ionic compound, $R_2PO_4^-$, $M^+$, that is insoluble in water under standard temperature and pressure conditions.

Two cations are likely to bind to the oxygen atoms of compound (I), which leads to an ionic compound, $RPO_4^{2-}$, 2 $M^+$, that is insoluble in water under standard temperature and pressure conditions.

Three cations are likely to bind to the oxygen atoms of compound (III), which leads to an ionic compound $PO_4^{3-}$, 3 $M^+$.

When the constituent compounds of the hydrophobization agent according to the invention are in neutralized form, M represents a monovalent, divalent or trivalent cation. M is, for example, selected from the group consisting of the potassium ion, the sodium ion, the lithium ion, the calcium ion, the magnesium ion or a mixture of these ions. M can also be a primary, secondary or tertiary amine.

According to another embodiment of the present invention, said hydrophobization agent consists of, in % by weight relative to the total weight of the hydrophobization agent:
  10 to 50% by weight of compounds of formula (I) and
  50 to 90% by weight of compounds of formula (II).

According to another embodiment of the present invention, said hydrophobization agent consists of, in % by weight relative to the total weight of the hydrophobization agent:
  10 to 50% by weight of compounds of formula (I),
  50 to 90% by weight of compounds of formula (II) and
  0.01 to 4% by weight of compounds of formula (III).

The hydrophobization agent according to the invention can be obtained by methods known to the person skilled in the art.

According to one embodiment of the present invention, said agent is obtained by the reaction of phosphoric anhydride ($P_2O_5$) with an alcohol of formula (V):

$$ROH \quad\quad\quad (V)$$

in which R represents $C_nH_{2n+1}$, where n is an integer that varies between 6 and 40, the group $C_nH_{2n+1}$ being branched, possibly cyclic, non-aromatic.

According to one embodiment of the invention, the alcohol of formula (V) ROH is chosen to be a linear primary alcohol with a branch on the carbon chain. Such an alcohol of the 2-alkyl-1-alkanol type is known by the name Guerbet alcohol.

According to another embodiment of the invention, the alcohol of formula (V) ROH is selected from the group consisting of 2-tetradecyloctadecanol, 2-dodecylhexadecanol, 2-octyldodecanol, 2-decyltetradecanol, 2-hexyldecanol and 2-butyloctanol.

One object of the present invention concerns the method for preparing the hydrophobization agent of the invention, as described above.

More precisely, the invention relates to the method for preparing a hydrophobization agent as defined above, said method comprising a step of reaction between phosphoric anhydride ($P_2O_5$) and an alcohol of formula (V):

$$ROH \quad\quad\quad (V)$$

in which R represents $C_nH_{2n+1}$, where n is an integer that varies between 6 and 40, the group $C_nH_{2n+1}$ being branched, possibly cyclic, non-aromatic.

Said method for preparing a hydrophobization agent according to the invention may further comprise an additional step of neutralization, i.e. the addition of a neutralizing agent.

According to one embodiment of the present invention, the method for preparing a hydrophobization agent comprises a step of reaction between phosphoric anhydride ($P_2O_5$) and an alcohol of formula ROH (V) and another alcohol of formula R'OH (VI) in which R' represents a $C_mH_{2m+1}$ group, linear or branched, where m ranges from 6 to 60. According to this embodiment, a hydrophobization agent is obtained which comprises a mixture:
  of compounds of formulas (I) and (II) described above, $X_2PO_4R$ and $XPO_4R_2$, where R represents $C_nH_{2n+1}$, where n is an integer that varies between 6 and 40, the $C_nH_{2n+1}$ group being branched, possibly cyclic, non-aromatic and in which X represents H or M,
  of compounds $H_2PO_4R'$ and $HPO_4R'_2$, in which R' represents H or a $C_mH_{2m+1}$ group, linear or branched, where m ranges from 6 to 60, and
  of compound $HPO_4RR'$, in which R and R' are as defined above.

The compounds described above can then be neutralized and thus be found in acidic or (partially or totally) neutralized form.

Another object of the present invention relates to the method for preparing surface-treated mineral matter particles, comprising the steps consisting of:
  a) making available a hydrophobization agent for mineral matter particle according to the invention,
  b) making available particles of mineral matter selected from the group consisting of talc, titanium dioxide, mica, gypsum, alumina, kaolin, magnesia, lime and a mixture of at least two of these minerals, and
  c) bringing the mineral matter particles of step b) into contact with the hydrophobization agent of step a).

Such a method is advantageous in that it provides treated mineral matter particles, i.e. ones which have a hydrophobic surface, that can be used directly by the formulator.

In fact, to have matter particles that are compatible with hydrophobic polymers (PE or PP, for example), the formulator must add a hydrophobization agent to his formulation. In some cases, this agent is in the wax state at room temperature and must therefore be melted before use.

Making treated mineral matter particles available reduces preparation time for the formulator.

According to step a) of the method, a mineral matter particle hydrophobization agent is made available according to the invention.

According to step b) of the method, mineral matter particles are made available that are selected from the group consisting of talc, titanium dioxide, gypsum, carbon black, mica, alumina, kaolin, magnesia, lime and a mixture of at least two of these minerals. These particles can be found alone or mixed with other mineral matter particles.

According to one embodiment of the present invention, said mineral matter particles are found in dry or powdered form, that is, in the form of a powder.

"Dry" is understood to mean mineral matter particles with a total surface moisture content less than 0.5% by weight, for example, less than 0.2% by weight or less than 0.1% by weight relative to the total weight of the mineral matter particles.

The term "powder", as it is used in the present invention, covers solid mineral powders that are at least 90% inorganic mineral matter by weight relative to the total weight of the powder.

According to another embodiment of the present invention, said mineral matter particles are in the form of an aqueous suspension, also known as a slurry.

According to the present invention, the term "slurry" means an aqueous suspension that comprises insoluble solids and optionally at least one additive.

In the context of the present invention, it may be necessary to subject the mineral matter to a grinding process before bringing the particles into contact with the hydrophobization agent according to step c) of the method of the present invention, so as to obtain mineral matter particles of the desired size. This grinding step can be done using any conventional grinding device known to the person skilled in the art.

It may also be necessary to dry the mineral matter particles before or during the particles coming in contact with the hydrophobization agent according to step c) of the method of the present invention, so as to obtain particles in the form of a powder.

In the context of the present invention, it may be necessary to heat the hydrophobization agent in order to obtain a hydrophobization agent in the molten state, this heating step taking place before step c) of the contact with the mineral matter particles, and at a temperature related to the phase change temperature of the hydrophobization agent. The hydrophobization agent can be heated to a temperature of at least 50° C., for example, to at least 75° C., or to between 50 and 120° C., or to between 70 and 100° C. The hydrophobization agent is thus obtained in the molten form.

According to step c) of the method, the mineral matter particles of step b) are brought into contact with the hydrophobization agent of step a).

Bringing the mineral matter particles into contact with the hydrophobization agent according to the invention makes the particle surfaces more hydrophobic and thus results in surface-treated particles. The particles that result can then be used as fillers in a variety of applications, for example, in thermoplastic compositions. Such a surface treatment of particles particularly solves the problem of incompatibilities with the hydrophobic polymers (PP and PE, for example) that constitute thermoplastic compositions.

In the method of the present invention, the bringing of mineral matter particles into contact with the hydrophobization agent according to step c) is, for example, achieved by mixing the particles with the hydrophobization agent. "Mixing" within the meaning of the present invention means any standard mixing method known to the person skilled in the art. Mixing is preferably carried out under continuous agitation so that all the mineral matter particles are equally brought into contact with the hydrophobization agent.

The bringing of the particles and the hydrophobization agent into contact according to step c) can take place at room temperature or at a temperature higher than room temperature.

For example, step c) can take place at a temperature that is adjusted so that the hydrophobization agent is in the liquid or molten state. The temperature for bringing the particles to be hydrophobized into account with the agent according to the invention can result from the shearing of the mixing device used, or alternatively, from an external source, or from a combination of the two.

Another object of the present invention relates to the surface-treated mineral matter particles obtained by the method of the invention.

Still another object of the present invention consists of a homogeneous composition comprising a mineral matter particle hydrophobization agent according to the invention, the mineral matter particles selected from the group consisting of talc, titanium dioxide, mica, alumina, gypsum, kaolin, magnesia, lime and a mixture of at least two of these minerals, and at least one other component, for example, a polymer resin.

Still another object of the present invention consists of a homogeneous composition comprising mineral matter particles that are surface-treated according to the present invention and at least one other constituent, for example, a polymer resin.

According to one embodiment of the invention, the homogeneous composition according to the invention comprises:
from 50 to 99%, for example, from 60 to 99% by weight of said treated mineral matter particles, and
from 1 to 50%, for example, from 1 to 40% by weight of said polymer resin.

Another object of the present invention concerns the use of a mineral matter particle hydrophobization agent according to the invention for the surface treatment of mineral matter particles.

EXAMPLES

Example 1

The purpose of this example is to illustrate the preparation of eight hydrophobization agents by the reaction of phosphoric anhydride with an alcohol of the linear alkyl chain type (outside of the invention) or of the branched alkyl chain type (invention), the alkyl chains being non-cyclic and non-aromatic.

The reaction produces a mixture of mono-ester and di-ester phosphoric compounds.

Example of the Preparation of a Hydrophobization Agent According to the Invention Consisting of a Mixture of Compounds of Formulas (I) and (II) in which R Represents a 2-tetradecyloctadecanyl Alkyl Chain 200 g of Isofol® 32 (SASOL) are placed in a 400 mL beaker equipped with a magnetic bar for agitation. The contents are heated to 70° C.

Using a spatula, 30.4 g of phosphoric anhydride ($P_2O_5$) are gradually added over a period of one hour. The temperature is kept between 70 and 80° C. during this addition step. The contents are cooked under agitation for 4 hours at a temperature of approximately 65° C. until all the grains of $P_2O_5$ have disappeared.

A brown, homogenous liquid is obtained.

The percentage by weight of phosphoric monoesters, phosphoric diesters, and phosphoric acid, as well as the monoester:diester molar ratio of the hydrophobization agent thus obtained are determined by assay using a potentiometer (DL20 Mettler).

First comes the preparation of the sample.

0.3 g of hydrophobization agent is added under magnetic agitation to a heated mixture of solvents (50° C.<t<60° C.) consisting of 50 mL of methyl ethyl ketone (MEK) and 70 mL of isopropanol. At the time of the assay, 30 mL of bipermutated water heated to 60° C. are added.

The assay is performed using 0.1 N sodium hydroxide. During the assay, the sample is kept under agitation on the potentiometer and at a temperature between 50° C. and 60° C. by means of a hot plate.

Two equivalent points corresponding to two volumes V1 and V2* are obtained. A solution of 0.1 N hydrochloric acid is then added until a pH of 10.6 is obtained. Finally 15 mL of a 10% $CaCl_2$ solution are added.

An assay using 0.1 N sodium hydroxide is performed. The equivalent point corresponding to volume V3 is obtained.

The percentages by weight of the phosphoric monoesters, the phosphoric diesters and the phosphoric acid in the resulting product can be determined using the formulae below:

$$\% \text{ monoester} = \frac{(V2 - V3)MmonoT}{1000pe}$$

$$\% \text{ diester} = \frac{(V1 - V2)MdiT}{1000pe}$$

$$\% \text{ H}_3\text{PO}_4 = \frac{V3MhT}{1000pe}$$

In which:
T: titre of the 0.1N sodium hydroxide solution
V1 and V3: given by the assay
V2=V2* (given by the assay) −V
V: determined by assay of the solvent mixture with 0.1 N sodium hydroxide
pe: test portion in g
Mmono: molecular mass of the monoester
Mdi: molecular mass of the diester
Mh: molecular mass of the phosphoric acid (98 g/mol)
The characteristics of the hydrophobization agents prepared in this way are given in table 1 below:

TABLE 1

|  | Tests | | | |
|---|---|---|---|---|
|  | 1-1 OI | 1-2 INV | 1-3 OI | 1-4 OI |
| n | 12 | 12 | 16-18 | 16-18 |
| $C_nH_{2n}$ Structure | linear | branched | linear | linear hydrolized |
| % monoester | 13.2 | 19.4 | 23.2 | 24 |
| % diester | 86.6 | 80.4 | 76.2 | 74 |
| % $H_3PO_4$ | 0.2 | 0.2 | 0.6 | 2 |
| Mono molar ratio:diester | 1:4 | 1:4 | 1:2 | 1:2 |

|  | Tests | | | |
|---|---|---|---|---|
|  | 1-5 INV | 1-6 OI | 1-7 INV | 1-8 INV |
| n | 20 | 28 | 28 | 32 |
| $C_nH_{2n}$ Structure | branched | linear | branched | branched |
| % monoester | 18.2 | 37.3 | 19.7 | 19.5 |
| % diester | 81.8 | 61.1 | 80.3 | 80.6 |
| % $H_3PO_4$ | nd | 1.6 | nd | nd |
| Mono molar ratio:diester | 1:2.4 | 1:14 | 1:14 | 1:2.3 | nd: not detectable
Test 1-2: R represents 2-butyloctanyl
Test 1-5: R represents 2-octyldodecanyl
Test 1-7: R represents 2-dodecylhexadecanyl
Test 1-8: R represents 2-tetradecyloctadecanyl Example 2

This example, outside of the invention, is intended to illustrate the preparation of $CaCO_3$ particles that are surface-treated by use of a hydrophobization agent as described in tests 1-1 and 1-2 of example 1 above.

More specifically, a mixer of the Guedu brand, type 4.5NO is pre-heated to 80° C. 1,000 g of $CaCO_3$ (Millicarb® Omya, $d_{50}$=3 μm) are added to the mixer. Then, gently and under agitation, 11.4 g of the hydrophobization agent according to test 1-1 (OI) or test 1-2 (INV) are brought into contact in the mixer with the $CaCO_3$ particles. If necessary, the hydrophobization agent is melted beforehand at 70° C. prior to being added to the mixer.

The mixing is carried out for 15 minutes under minimum agitation.

Surface-treated particles of $CaCO_3$ are obtained.

Example 3

This example, outside of the invention, is intended to illustrate the preparation of granules of a thermoplastic composition from particles of calcium carbonate and in the presence of hydrophobization agents according to tests 1-1 to 1-8 of example 1 above.

The following mixture is introduced into the receptacle of a Guedu type 4.5NO mixer preheated to 140° C.:
 875 g of $CaCO_3$ particles (Millicarb® Omya, $d_{50}$=3 μm),
 10 g of hydrophobization agent according to tests 1-1 to 1-8, and
 115 g of a polymer resin consisting of 49.5% by weight of Vestoplast™ 508 (HULS), 49.5% by weight of Vestoplast™ 408 (HULS), 0.5% by weight of Irganox™ (Ciba thermal stabilization agent) and 0.5% by weight of Tinuvin.

The mixture is created at a temperature of 140° C. and at maximum speed (the speed setting on the H position, the scale ranging from A to H with H being the highest). The mixing is maintained for 18 minutes.

In a second step, the mixing, set to a reduced speed (position A), is maintained for 2 minutes.

The total mixing time is 20 minutes.

The resulting stock is spread out hot on a plate.

It is then converted into the form of granules (or aggregates or pellets) by means of a knife and then left to rest for 15 hours before measuring the MFI.

The Melt Flow Index of the granules of the thermoplastic composition is measured according to the ASTM D 1238 standard by adding granules into the siphon of a Zwick brand 4105 type plastometer. It corresponds to the amount of the thermoplastic composition in the form of granules, expressed in grams per 10 minutes, that flows at a temperature of 150° C. (included in the interval bounded by the plasticizing and transformation temperatures) under a standardized given load (5 kg in this case) through a die with a specified diameter (approx. 2.1 mm) during a 10-minute period.

TABLE 2

|  | Tests | | | |
|---|---|---|---|---|
|  | 3-1 | 3-2 | 3-3 | 3-4 |
|  | OI | INV | OI | OI |
| n | 12 | 12 | 16-18 | 16-18 |
| $C_nH_{2n}$ Structure | linear | branched | linear | Hydroxylated linear |
| MFI (150° C.-5 kg) | 2.08 | 6.9 | 2.13 | 3.19 |

|  | Tests | | | |
|---|---|---|---|---|
|  | 3-5 | 3-6 | 3-7 | 3-8 |
|  | INV | OI | INV | INV |
| n | 20 | 28 | 28 | 32 |
| $C_nH_{2n}$ Structure | branched | linear | branched | branched |
| MFI (150° C.-5 kg) | 9.64 | 8.68 | 9.49 | 11.37 |

Example 4

This example, outside of the invention, is intended to illustrate the preparation of granules of a thermoplastic composition from calcium carbonate particles that are surface-treated by means of a hydrophobization agent as obtained according to example 2.

The following mixture is introduced into the receptacle of a Guedu type 4.5NO mixer preheated to 140° C.:
 885 g of $CaCO_3$ particles (Millicarb® Omya, $d_{50}$=3 μm) surface-treated according to example 2, and
 115 g of a polymer resin consisting of 49.5% by weight of Vestoplast™ 508 (HULS), 49.5% by weight of Vestoplast™ 408 (HULS), 0.5% by weight of Irganox™ (Ciba thermal stabilization agent) and 0.5% by weight of Tinuvin.

The MFI is measured here under 5 kg at 150° C.

TABLE 3

|  | Tests | | |
|---|---|---|---|
|  | 4-1 | 4-2 | 4-3 |
|  | OI | INV | INV |
| n | 12 | 12 | 20 |
| $C_nH_{2n}$ Structure | linear | branched | branched |
| MFI (150° C.-5 kg) | 2.3 | 4.9 | 10.7 |

Example 5

This example is intended to illustrate the preparation according to the invention of titanium dioxide particles that are surface-treated by use of a hydrophobization agent as described in tests 1-6 and 1-7 of example 1 above.

More specifically, a mixer of the Vorwerk type is pre-heated to 100° C. 500 g of TiO$_2$ (Kronos® 2220) are added to the mixer. Then, gently and under agitation, 7.14 g of the hydrophobization agent according to test 1-6 (OI) or test 1-7 (INV) are brought into contact in the mixer with the particles of TiO$_2$. If necessary, the hydrophobization agent is melted beforehand at 70° C. before being added to the mixer.

The mixing is carried out for 15 minutes under minimum agitation.

Surface-treated particles of TiO$_2$ are obtained.

Example 6

This example is intended to illustrate the preparation according to the invention of granules of thermoplastic composition from TiO$_2$ particles that are surface-treated by means of a hydrophobization agent as obtained according to example 5.

The following mixture is introduced into an RMC Guittard mixer pre-heated to 170° C.:
- 284 g de of TiO$_2$ particles that are surface treated according to example 5, and
- 116 g of a polymer resin consisting of 110.4 g of low density polyethylene (Repsol), 3.2 g of zinc stearate and 2.4 g of an antioxidant.

The mixing is carried out over a 20 minute period at 160° C. (under slow agitation for 5 minutes and then under rapid agitation for 15 minutes).

The MFI is measured here under 5 kg at 190° C.

TABLE 4

|  | Tests | |
|---|---|---|
|  | 6-1 OI | 6-2 INV |
| n | 28 | 28 |
| C$_n$H$_{2n}$ Structure | linear | branched |
| MFI (150° C.-5 kg) | 16.0 | 17.0 |

The invention claimed is:

1. A process for preparing surface-treated mineral matter particles, comprising bringing into contact mineral matter particles selected from talc, titanium dioxide, gypsum, mica, alumina, kaolin, magnesia, lime and mixtures thereof with a hydrophobization agent, wherein the hydrophobization agent comprises a mixture of compounds of formulae (I) and (II):

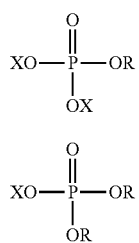

in which:
R represents C$_n$H$_{2n+1}$ where n is an integer that varies between 6 and 40, the group C$_n$H$_{2n+1}$ being branched, optionally cyclic, non-aromatic,
X represents H or M, and
M represents a monovalent, divalent or trivalent cation.

2. The process according to claim 1, wherein the molar ratio between the compound of formula (I) and the compound of formula (II) in the hydrophobization agent varies between 1:100 and 10:1.

3. The process according to claim 1, wherein the number n of the R group in formulae (I) and (II) ranges from 12 to 32.

4. The process according to claim 1, wherein R is selected from the group consisting of 2-butyloctanyl, 2-hexyldecanyl, 2-octyldodecanyl, 2-decyltetradecanyl, 2-dodecylhexadecanyl and 2-tetradecyloctadecanyl.

5. The process according to claim 1, wherein the hydrophobization agent further comprises a compound of formula (III):

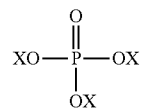

where X represents H or M, and M represents a monovalent, divalent or trivalent cation.

6. The process according to claim 1, wherein the hydrophobization agent does not comprise a compound of formula (IV):

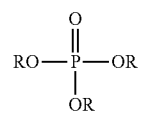

where R represents C$_n$H$_{n+1}$ where n is an integer that varies between 6 and 40, the group C$_n$H$_{2n+1}$ being branched, optionally cyclic, non-aromatic.

7. Surface-treated mineral matter particles obtained by the method of claim 1.

8. The process according to claim 1, wherein M is selected from potassium ion, sodium ion, lithium ion, calcium ion, magnesium ion and mixtures thereof.

9. The process according to claim 1, wherein M is selected from a primary amine, a secondary amine, a tertiary amine and mixtures thereof.

10. The process according to claim 1, wherein said hydrophobization agent comprises, in % by weight relative to the total weight of the hydrophobization agent:
10 to 50% by weight of compounds of formula (I) and
50 to 90% by weight of compounds of formula (II).

11. The process according to claim 5, wherein said hydrophobization agent comprises, in % by weight relative to the total weight of the hydrophobization agent:
10 to 50% by weight of compounds of formula (I),
50 to 90% by weight of compounds of formula (II) and
0.01 to 4% by weight of compounds of formula (III).

* * * * *